(12) United States Patent
Yun

(10) Patent No.: US 7,489,329 B2
(45) Date of Patent: Feb. 10, 2009

(54) SCANNING APPARATUS USING VIBRATION LIGHT MODULATOR

(75) Inventor: Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 185 days.

(21) Appl. No.: 10/952,526

(22) Filed: Sep. 28, 2004

(65) Prior Publication Data
US 2005/0243164 A1   Nov. 3, 2005

(30) Foreign Application Priority Data
Apr. 29, 2004   (KR)   ............... 10-2004-0029927

(51) Int. Cl.
*B41J 2/47* (2006.01)
*G02B 26/02* (2006.01)
(52) U.S. Cl. ..................... 347/255; 347/239
(58) Field of Classification Search ............ 359/30, 359/237–324, 558–576, 291, 443, 230, 231; 347/238–239, 255, 135–137, 145; 355/40; 353/30; 356/305, 328, 334
See application file for complete search history.

(56) References Cited

U.S. PATENT DOCUMENTS

| | | | | |
|---|---|---|---|---|
| 4,376,568 A | * | 3/1983 | Sprague | 359/315 |
| 5,949,570 A | * | 9/1999 | Shiono et al. | 359/291 |
| 5,986,781 A | * | 11/1999 | Long | 359/30 |
| 6,025,859 A | * | 2/2000 | Ide et al. | 347/135 |
| 6,147,789 A | * | 11/2000 | Gelbart | 359/231 |
| 6,229,650 B1 | * | 5/2001 | Reznichenko et al. | 359/566 |
| 6,580,490 B1 | * | 6/2003 | Wong et al. | 355/40 |
| 6,856,448 B2 | * | 2/2005 | Fitzpatrick et al. | 359/291 |
| 7,057,809 B2 | * | 6/2006 | Kubota et al. | 359/443 |
| 2006/0017887 A1 | * | 1/2006 | Jacobson et al. | 353/30 |

* cited by examiner

*Primary Examiner*—Hai C Pham
(74) *Attorney, Agent, or Firm*—Christensen O'Connor Johnson Kindness PLLC

(57) ABSTRACT

The present invention relates, in general, to scanning apparatuses using a vibration light modulator and, more particularly, to a scanning apparatus using a vibration light modulator, which performs high speed scanning using a plurality of diffracted beams, formed from a single beam by the reflection and diffraction thereof, and allows each of diffracted beams to form a plurality of pixels by vibrating actuating cells of the light modulator.

11 Claims, 8 Drawing Sheets

SCANNING APPARATUS USING VIBRATION LIGHT MODULATOR

BACKGROUND OF THE INVENTION

1. Field of the Invention

The present invention relates, in general, to scanning apparatuses using a vibration light modulator and, more particularly, to a scanning apparatus using a vibration light modulator, which performs high speed scanning using a plurality of diffracted beams formed through the light modulator, and allows each of the diffracted beams to form a plurality of pixels by vibrating the light modulator.

2. Description of the Related Art

Printer technology has been developed toward high speed, miniaturization, high quality and low cost. Typical printers employ a laser scanning scheme of scanning laser beams using a Laser Diode (LD) and an f-θ lens.

In order to realize a high speed printer, an image head scheme using a multibeam type beam generation device is used. In such a scheme, high speed and high quality characteristics can be realized, but the cost increases due to the use of a plurality of light sources.

FIG. 1 illustrates an example in which a conventional laser scanning scheme using a single light source and an f-θ lens is used. As shown in FIG. 1, an example of the operation of the laser scanning scheme is described below.

If a light beam is generated by a Laser Diode (LD) 10 in response to a video signal and passes through a collimator lens 20, the light beam is converted into collimated light. The collimated light is converted into linear light parallel to a scanning direction by a cylindrical lens 30, and the linear light is incident on a polygon mirror 40.

As described above, if the linear light parallel to the scanning direction is incident by the cylindrical lens 30, the polygon mirror 40, rotated by a motor, scans the incident linear light in the direction of an f-θ lens 50.

Thereafter, the linear light scanned at a constant angular velocity by the polygon mirror 40 is deflected by the f-θ lens 50 in a scanning direction, the aberration of the deflected linear light is corrected, and the corrected light is scanned onto the scanning surface of a photosensitive drum 60 at a uniform velocity.

In the laser scanning scheme, it is difficult to attain a high printing speed due to problems related to the low switching speed of the laser diode 10 and the scanning speed of the polygon mirror 40.

That is, in order to increase the scanning speed of light beams, the polygon mirror 40 must be rotated using a higher speed motor. However, the higher speed motor is expensive, and the motor rotating at high speed causes heat, vibration and noise to incur problems such as the deterioration of operating reliability, so that a great improvement in scanning speed cannot be expected.

In another method of increasing the speed of an optical scanning apparatus, there is an image head printing scheme using a multibeam type beam generation device.

That is, as shown in FIG. 2, an array 80 of many Light Emitting Diodes (LEDs), the number of which is sufficient to fill printing paper, is constructed in an image head 70 to form a plurality of beams, so that one line can be simultaneously printed without using a polygon mirror and an f-θ lens, unlike the laser scanning scheme, thus markedly increasing printing speed.

However, if a plurality of LEDs is used so as to construct the LED array 80, the cost increases, and light uniformity between LEDs in the array is decreased, so that it is difficult to obtain uniform images.

SUMMARY OF THE INVENTION

Accordingly, the present invention has been made keeping in mind the above problems occurring in the prior art, and an object of the present invention is to provide a scanning apparatus, which performs high speed scanning using a plurality of diffracted beams formed by a light modulator and allows each of the diffracted beams to form a plurality of pixels by vibrating the light modulator.

In order to accomplish the above object, the present invention provides a scanning apparatus using a vibration light modulator, comprising a first lens unit for scanning a single beam, emitted from a light source, parallel to an optical path direction; a light modulator for generating a plurality of diffracted beams from the single beam by reflection and diffraction of the single beam; vibration means for vibrating the light modulator to allow each of the diffracted beams to form a plurality of pixels; a slit for allowing diffracted beams having certain diffraction coefficients, among the plurality of diffracted beams incident from the light modulator, to pass therethrough; and a second lens unit for radiating the diffracted beams having certain diffraction coefficients, selectively passed through the slit, onto a photosensitive surface of a photosensitive member while spacing the diffracted beams apart from each other by a predetermined distance.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the construction of a scanning apparatus using a diffractive light modulator according to embodiments of the present invention will be described in detail with reference to the attached drawings. In the embodiments of the present invention, a piezoelectric/electrostrictive diffractive light modulator is described as an example of a diffractive light modulator, but the present invention can also be applied to transmissive, reflective and other diffractive light modulators.

Figure 1:
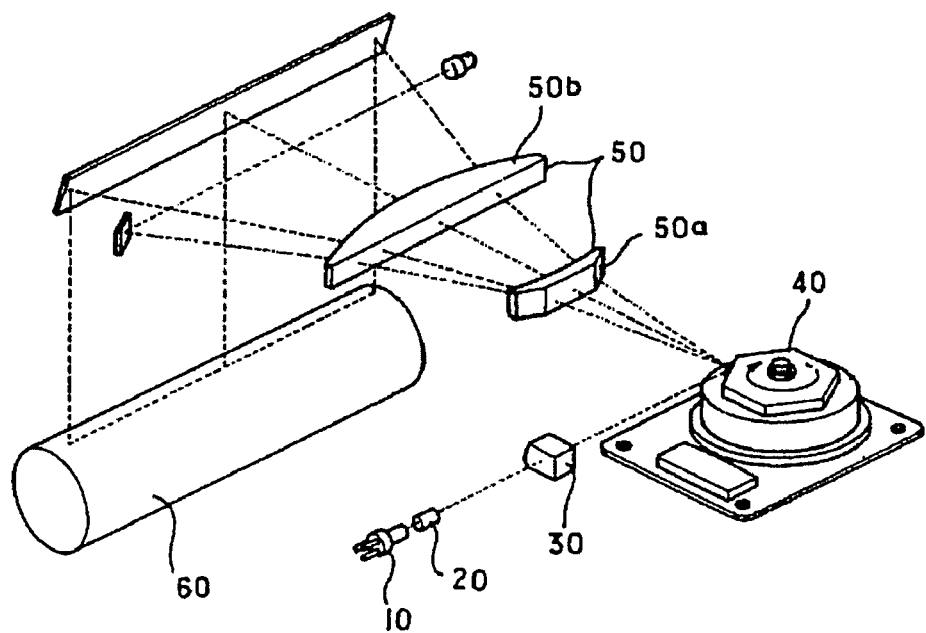
FIG. 1 is a view showing a conventional laser scanning scheme using a single light source and an f-θ lens.
Figure 2:
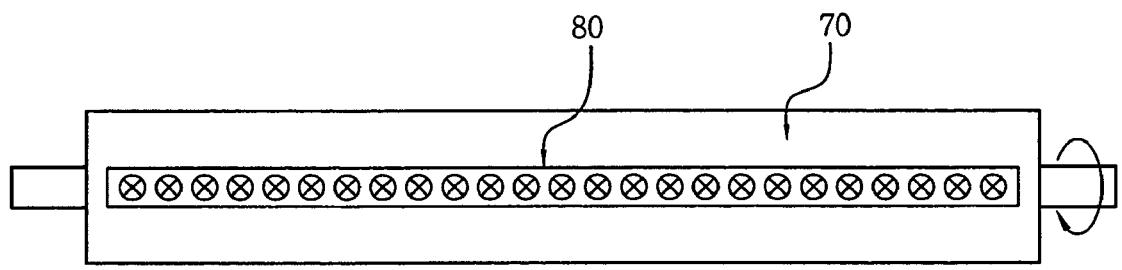
FIG. 2 is a view showing a conventional laser scanning scheme of performing laser scanning using a plurality of beams formed by an array of LEDs constructed in an image head.
Figure 3:
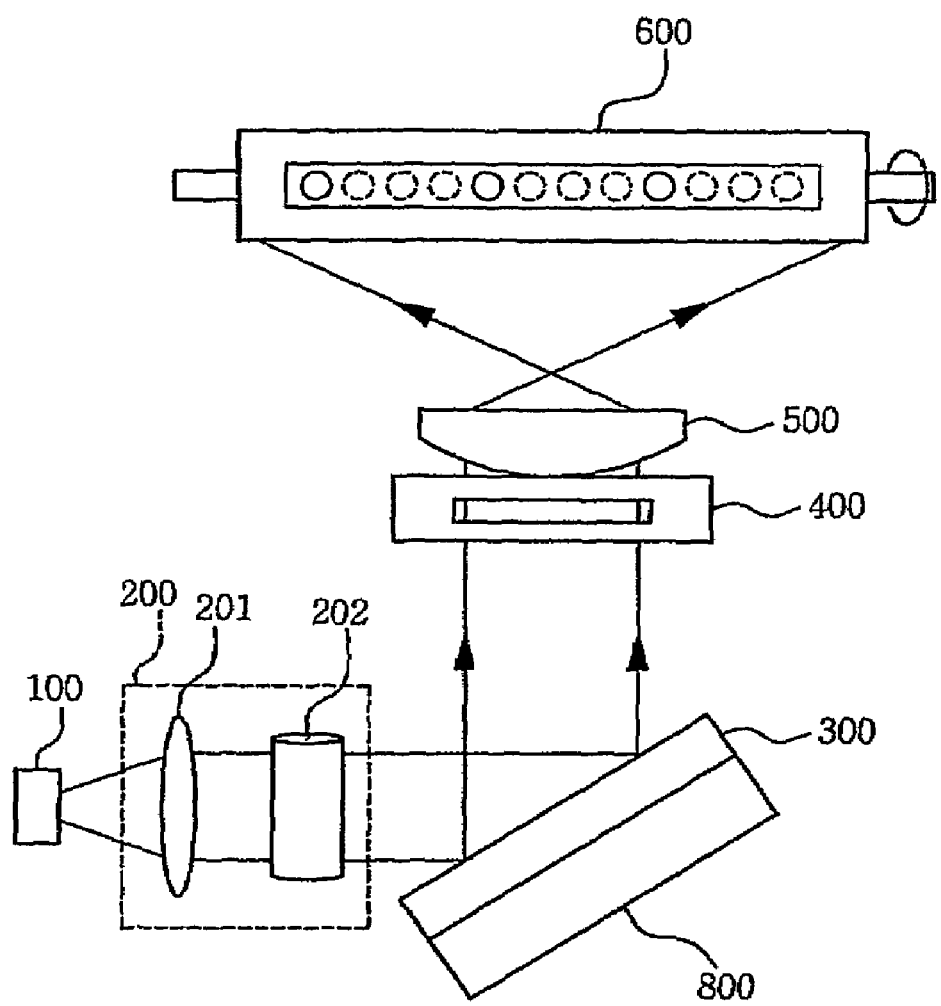
FIG. 3 is a view showing a single beam type scanning apparatus using a piezoelectric/electrostrictive diffractive vibration light modulator according to the present invention.
Figure 4A:
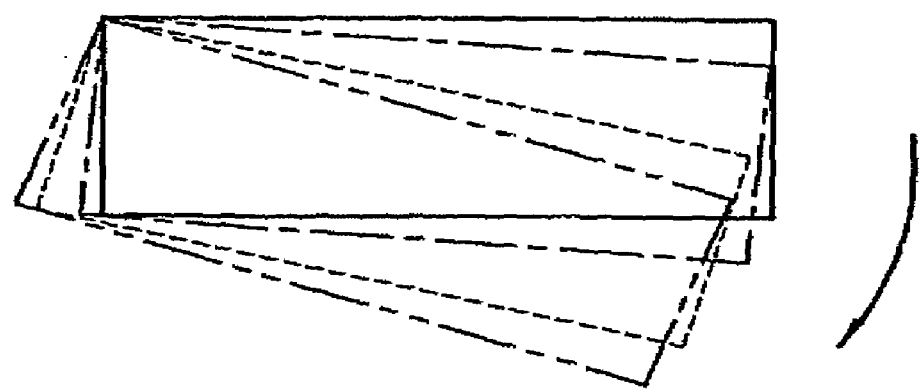
FIG. 4A is a view showing the vibration of actuating cells of FIG. 3.
Figure 4B:
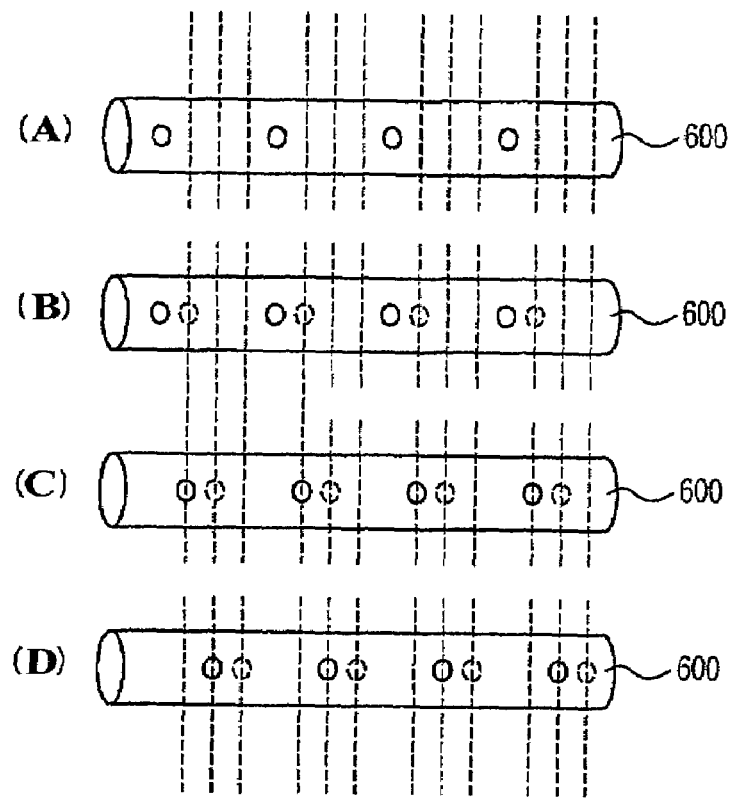
FIG. 4B is a view showing the movement of diffracted beams of FIG. 3.

First, with reference to FIGS. 3, 4A and 4B, the construction of a scanning apparatus using a diffractive vibration light modulator according to the present invention is described in detail.

The scanning apparatus using a diffractive vibration light modulator according to the present invention performs high speed scanning using a plurality of beams formed by diffraction occurring at a piezoelectric/electrostrictive diffractive light modulator, which performs a piezoelectric/electrostrictive driving operation due to externally applied drive power. The scanning apparatus includes a light source 100, a first lens unit 200, a piezoelectric/electrostrictive diffractive light modulator 300, a slit 400, a second lens unit 500, and a vibration means 800.

FIG. 3 illustrates the construction of the scanning apparatus that performs one-dimensional high speed scanning through the use of a piezoelectric/electrostrictive diffractive light modulator including a certain number of actuating cells, and implemented with pixels arranged in one-dimension.

However, it is also possible to construct a scanning apparatus that performs two-dimensional high speed scanning through the use of a piezoelectric/electrostrictive diffractive light modulator including a certain number of actuating cells, and implemented with pixels arranged in two-dimensions.

The light source 100 is comprised of one or more light emitting sources each implemented with a laser diode having a predetermined wavelength. Light emitted from the light source 100 is converted into linear light parallel to the direction of an optical path by the first lens unit 200, which will be described later. The linear light is incident on the piezoelectric/electrostrictive light modulator 300 placed parallel to the optical path direction.

The first lens unit 200 functions to convert a single beam emitted from the light source 100 into linear light parallel to the optical path direction and to focus the linear light onto the piezoelectric/electrostrictive diffractive light modulator 300, which will be described later, and includes a collimator lens 201 and a cylindrical lens 202.

The collimator lens 201 converts spherical light incident from the light source 100 into collimated light, and allows the collimated light to be incident on the cylindrical lens 202.

In order to allow the collimated light from the collimator lens 201 to be incident, in parallel, on the piezoelectric/electrostrictive diffractive light modulator 300 that is placed parallel to the optical path direction, the cylindrical lens 202 converts the collimated light into the parallel linear light, and allows the parallel linear light to be incident on the piezoelectric/electrostrictive diffractive light modulator 300 through a beam splitter (not shown), which will be described later.

The piezoelectric/electrostrictive diffractive light modulator 300 forms diffracted beams having predetermined diffraction coefficients by diffracting the single beam type linear light incident from the first lens unit 200, and horizontally scans the diffracted beams onto the photosensitive surface of a photosensitive member 600. The diffractive light modulator 300 includes a plurality of actuating cells each with a predetermined thin or thick film structure.

Figure 5:
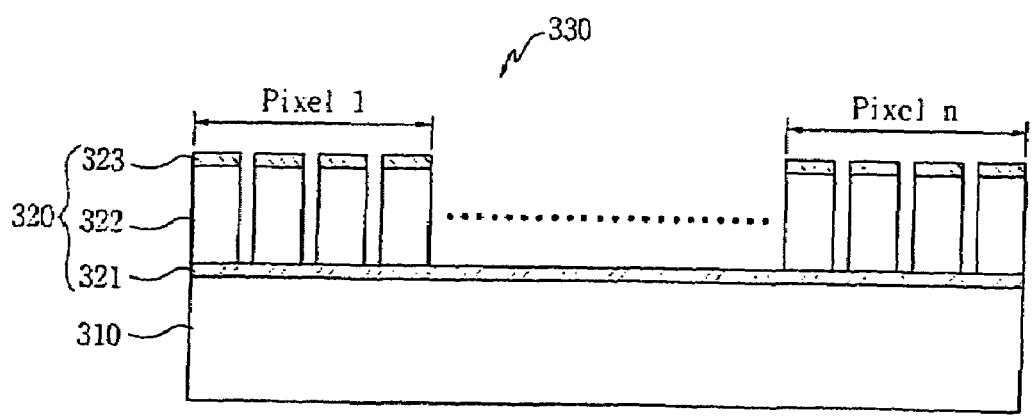
FIG. 5 is a view showing an array of actuating cells constituting a piezoelectric/electrostrictive diffractive light modulator of the present invention and having a thick film shape with a vertical length longer than a horizontal length.

That is, as shown in FIG. 5, the piezoelectric/electrostrictive diffractive light modulator includes actuating cells 320, each comprised of a lower electrode 321 formed on a substrate 310, a piezoelectric/electrostrictive layer 322 formed on the lower electrode 321, and an upper electrode 323 formed on the piezoelectric/electrostrictive layer 322, each vertically driven by externally applied drive power, and each formed in a thick film shape with a vertical length longer than a horizontal length.

Figure 6:
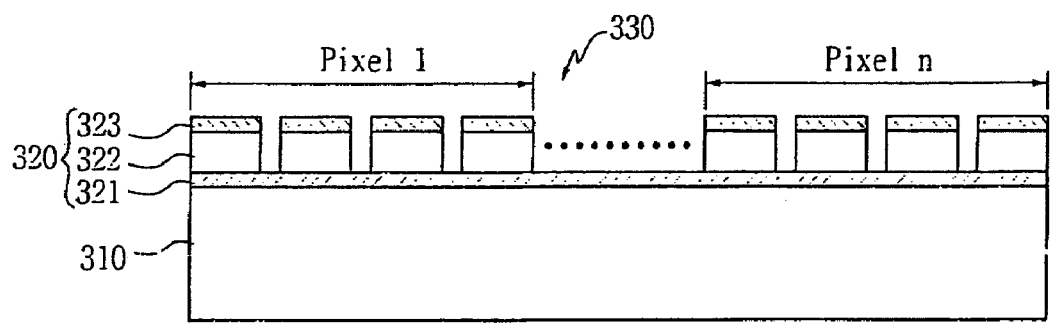
FIG. 6 is a view showing an array of actuating cells constituting a piezoelectric/electrostrictive diffractive light modulator of the present invention and having a thick film shape with a horizontal length longer than a vertical length.

In this case, as shown in FIG. 6, the piezoelectric/electrostrictive diffractive light modulator may be constructed to include actuating cells 320 each having a thick film shape with a horizontal length longer than a vertical length in consideration of the structural characteristics of a scanning device.

Figure 7:
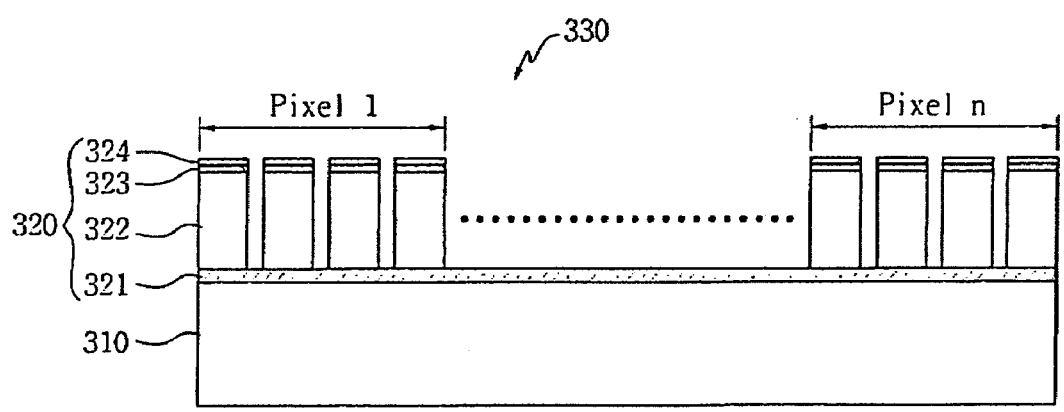
FIG. 7 is a view showing an array of actuating cells according to the present invention, on which micromirrors are formed, each actuating cell having a thick film shape with a vertical length longer than a horizontal length.
Figure 8:
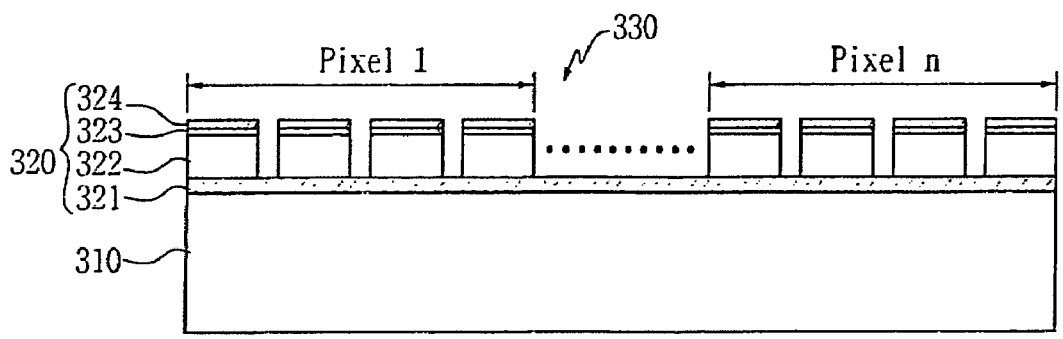
FIG. 8 is a view showing an array of actuating cells according to the present invention, on which micromirrors are formed, each actuating cell having a thin film shape with a horizontal length longer than a vertical length.

As shown in FIGS. 7 and 8, the piezoelectric/electrostrictive diffractive light modulator may be constructed to further include a micromirror 324 acting as a reflective surface to maximize the reflection efficiency of light incident on the upper electrode 323.

Figure 9:
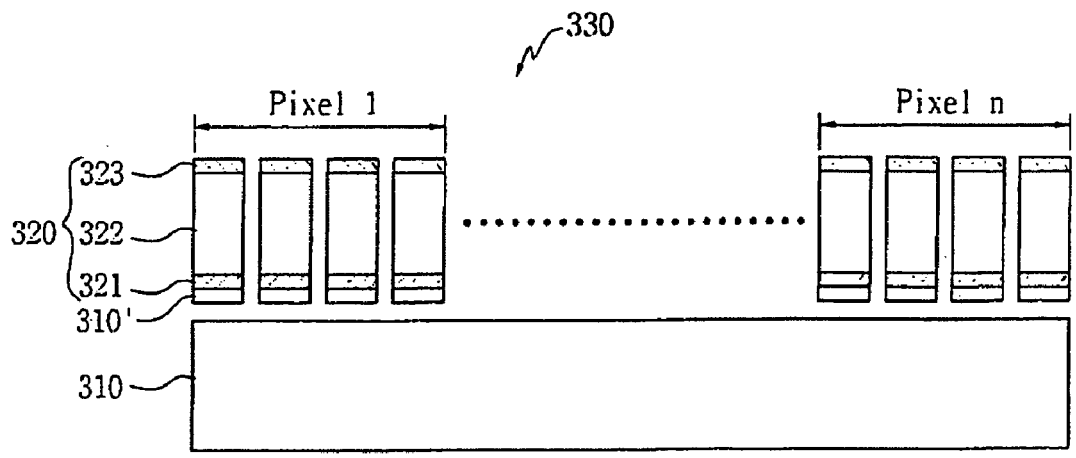
FIG. 9 is a view showing an array of actuating cells constituting a piezoelectric/electrostrictive diffractive light modulator of the present invention and having a thin film shape with a vertical length longer than a horizontal length.

As shown in FIG. 9, the piezoelectric/electrostrictive diffractive light modulator includes actuating cells 320 each comprised of a lower electrode 321, a piezoelectric/electrostrictive layer 322 and an upper electrode 323 that are sequentially formed on a silicon substrate 310, on which a depression for providing an air space is formed in a center portion, each horizontally driven by externally applied drive power, and each formed in a thin film shape with a vertical length longer than a horizontal length.

Figure 10:
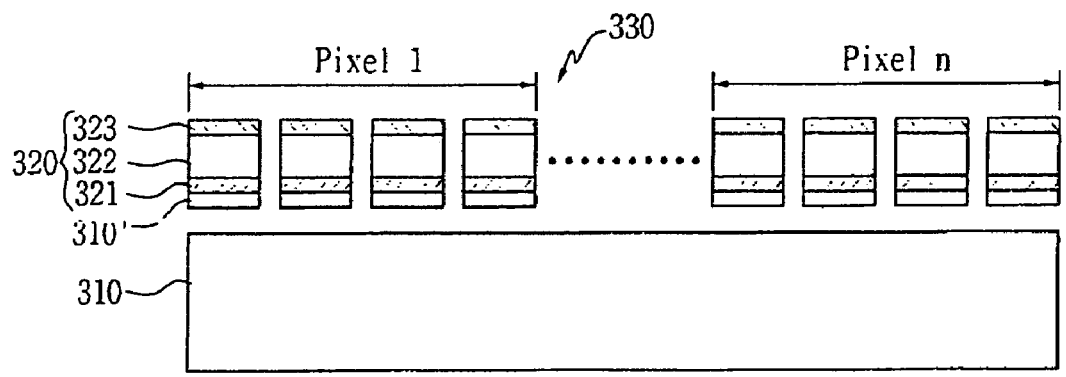
FIG. 10 is a view showing an array of actuating cells constituting a piezoelectric/electrostrictive diffractive light modulator applied to the present invention and having a thin film shape with a horizontal length longer than a vertical length.

In this case, as shown in FIG. 10, the piezoelectric/electrostrictive diffractive light modulator may be constructed to include actuating cells 320 each formed in a thin film shape with a horizontal length longer than a vertical length in consideration of the structural characteristics of a scanning device.

Figure 11:
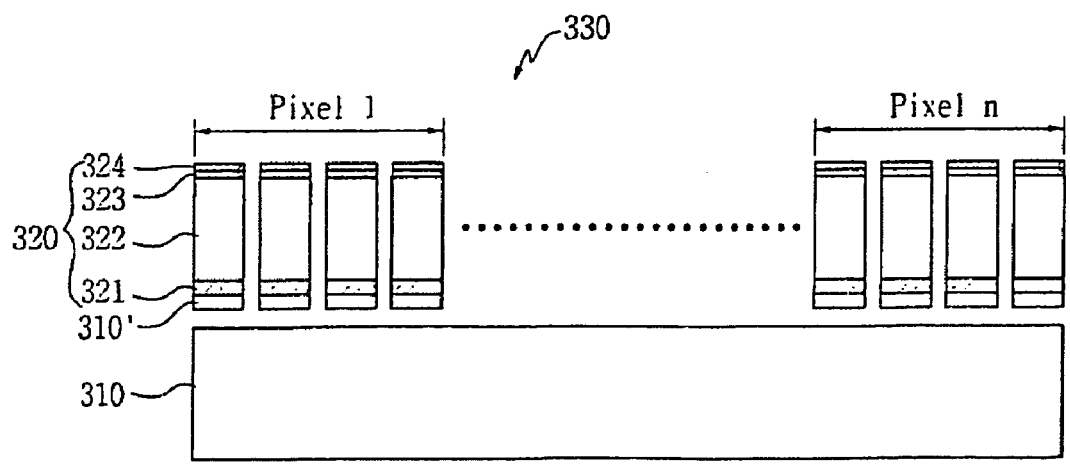
FIG. 11 is a view showing an array of actuating cells, on which micromirrors are formed, each actuating cell having a thin film shape with a vertical length longer than a horizontal length, according to the present invention.
Figure 12:
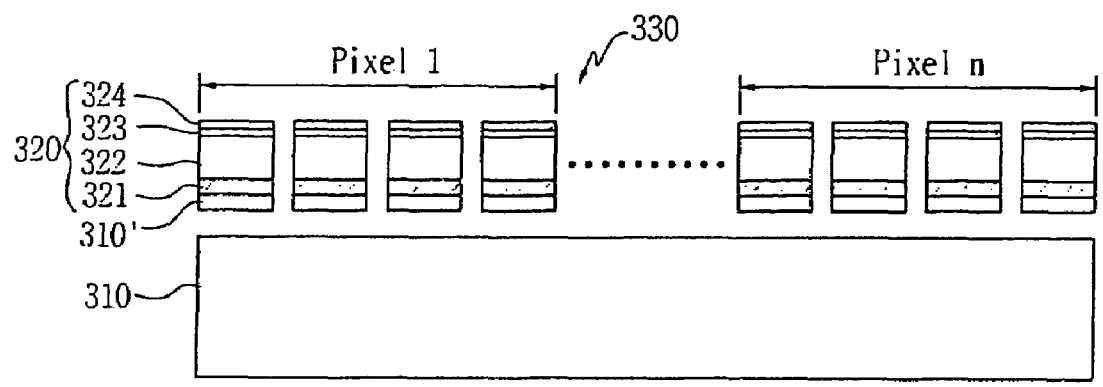
FIG. 12 is a view showing an array of actuating cells, on which micromirrors are formed, each actuating cell having a thick film shape with a horizontal length longer than a vertical length, according to the present invention.

As shown in FIGS. 11 and 12, the piezoelectric/electrostrictive diffractive light modulator may be constructed to further include a micromirror 324 acting as the reflective surface to maximize the reflection efficiency of light incident on the upper electrode 323.

In this case, the lower electrode 321 is formed on a substrate 310 constituting the actuating cells 320 each having a thick film shape to provide an externally applied drive voltage to the piezoelectric/electrostrictive layer 322, and formed on the substrate 310 by applying a sputtering or evaporation method to an electrode material, such as Pt, Ta/Pt, Ni, Au, Al, Ti/Pt, $IrO_2$ or RuO2.

Further, the lower electrode 321 is formed on a substrate 310 or lower supporting layer 310' constituting the actuating cells 320 each having a thin film shape, and functions to provide an externally applied drive voltage to the piezoelectric/electrostrictive layer 322.

In this case, the lower supporting layer 310' is evaporated and formed on the silicon substrate 310 to support the piezoelectric/electrostrictive layer 322 of the actuating cells 320 each having a thin film shape, and made of a material, such as $SiO_2$, $Si_3N_4$, Si, $ZrO_2$, or $Al_2O_3$. Such a lower supporting layer 310' may be omitted according to circumstances.

The piezoelectric/electrostrictive layer 322 is formed on the lower electrode 321 at a thickness range of 0.01 to 20.0 µm by applying a wet-type method (screen printing, Sol-Gel coating, etc.) or a dry-type method (sputtering, evaporation, Metal-Organic Chemical Vapor Deposition (MOCVD), vapor deposition, etc.) to a predetermined piezoelectric/electrostrictive material, the length of which is vertically or horizontally changed depending on a piezoelectric phenomenon occurring by the externally applied drive power, in particular, a material, such as PZT, PNN-PT, PLZT, AIN, ZnO, $P_b$, Zr or titanium.

The upper electrode 323 is formed on the piezoelectric/electrostrictive layer 322 to reflect and diffract light incident from the lens, and, in particular, formed at a thickness range of 0.01 to 3 µm by applying a sputtering or evaporation method to an electrode material, such as Pt, Ta/Pt, Ni, Au, Al, Ti/Pt, $IrO_2$, or RuO2.

In this case, the upper electrode 323 may act as a micromirror functioning to reflect and diffract an externally applied light signal, or may be constructed to further include the micromirror 324 made of Al, Au, Ag, Pt or Au/Cr, which is a light reflex material, so as to further strengthen the reflection and diffraction on the light signal.

In this case, the piezoelectric/electrostrictive diffractive light modulator is driven by the pixel 330 in which a certain number of actuating cells 320 are grouped together. The pixel 330 corresponds to a single dot on a photosensitive surface constituting the predetermined photosensitive member 600.

Figure 13A:
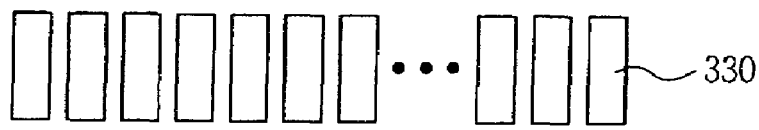
FIG. 13A is a view showing a one-dimensional array of pixels including a certain number of actuating cells and having a shape with a vertical length longer than a horizontal length, according to the present invention.
Figure 13B:
FIG. 13B is a view showing a one-dimensional array of pixels including a certain number of actuating cells and having a shape with a horizontal length longer than a vertical length, according to the present invention.

That is, as shown in FIGS. 13A and 13B, the piezoelectric/electrostrictive diffractive light modulator includes a certain number of actuating cells 320, and scans diffracted beams, formed by the diffraction at pixels 330 that are arranged in one dimension, onto the photosensitive surface, thus simultaneously performing one-dimensional scanning, in detail, scanning along one line.

In this case, FIG. 13A is a view showing an array structure in which pixels each having a vertical length longer than a horizontal length are arranged in one dimension, and FIG. 13B is a view showing an array structure in which pixels each having a horizontal length longer than a vertical length are arranged in one dimension.

Figure 14A:
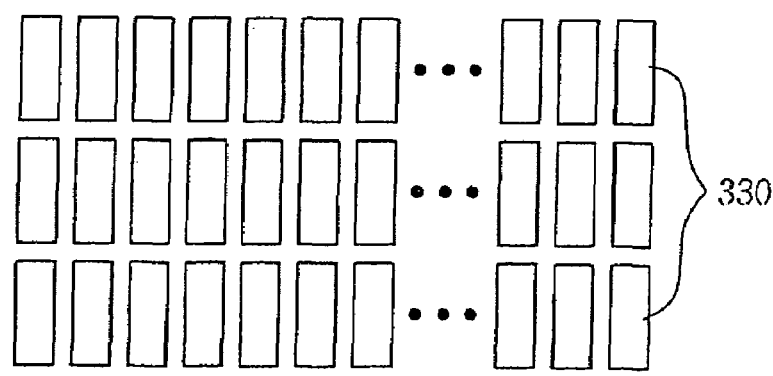
FIG. 14A is a view showing a two-dimensional array of pixels including a certain number of actuating cells and having a shape with a vertical length longer than a horizontal length.
Figure 14B:
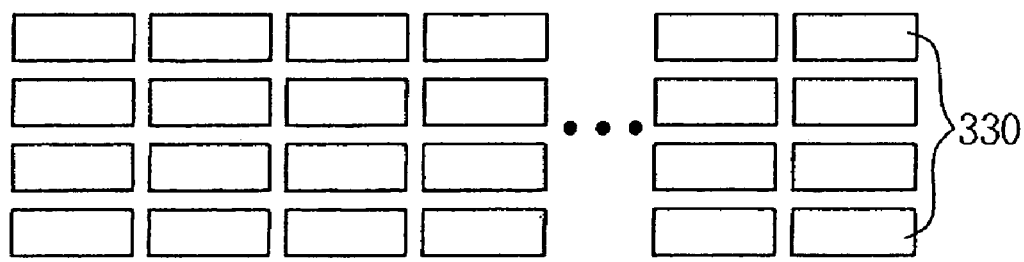
FIG. 14B is a view showing a two-dimensional array of pixels including a certain number of actuating cells and having a shape with a horizontal length longer than a vertical length.

Further, as shown in FIGS. 14A and 14B, the piezoelectric/electrostrictive diffractive light modulator 310 includes a certain number of actuating cells 320, and scans a two-dimensional diffracted beam, formed by the diffraction occurring at pixels 330 arranged in two dimensions, onto a photosensitive surface, thus performing two-dimensional scanning, in detail, simultaneous scanning along a plurality of lines.

In this case, FIG. 14A is a view showing an array of the pixels 330 arranged in two dimensions, each pixel having a vertical length longer than a horizontal length, and FIG. 14B is a view showing an array of the pixels 330 arranged in two dimensions, each pixel having a horizontal length longer than a vertical length.

That is, as shown in FIGS. 13A and 13B and 14A and 14B, the pixels 330 constituting the piezoelectric/electrostrictive light modulator 300 are arranged in one dimension or two dimensions to perform one-dimensional or two-dimensional scanning, thus simultaneously scanning beams along one or more lines.

In the drawings, only an example in which four actuating cells 320 form each pixel 330 is shown. However, it should be noted that the number of actuating cells 320 forming each pixel 330 is not limited to four, but can vary.

Hereinafter, with reference to FIGS. 15 and 16, the operation of the piezoelectric/electrostrictive diffractive light modulator is described.

The actuating cells 320 constituting each pixel 330 of the piezoelectric/electrostrictive diffractive light modulator 300 act as a reflector for reflecting incident light according to the existence of externally applied drive power, or act as a variable diffraction grating for generating diffracted beams having certain diffraction coefficients.

That is, the piezoelectric/electrostrictive diffractive light modulator 300 can generate diffracted beams, in detail, diffracted beams having 0th order, +1st order, −1st order, and higher order diffraction coefficients, due to the diffraction at each pixel 330 including a certain number of actuating cells 320. In this case, for convenience of description, the driving of the actuating cells 320 operating in conjunction with a 0th order diffracted beam is described.

First, if a single parallel beam is incident when drive power is not externally applied, respective pixels 330 constituting the piezoelectric/electrostrictive diffractive light modulator 300 do not cause diffraction because a step height is not formed between the actuating cells 320 constituting each pixel 330, so that the single beam is reflected in a direction equal to its incident direction and a 0th order diffracted beam is formed.

That is, in a reflection mode, the piezoelectric/electrostrictive diffractive light modulator 300 is in an ON state in which light incident through the first lens unit 200 is reflected and transmitted to the photosensitive member 600 through the second lens unit 500, in detail, a projection lens, which will be described later.

Figure 15A:
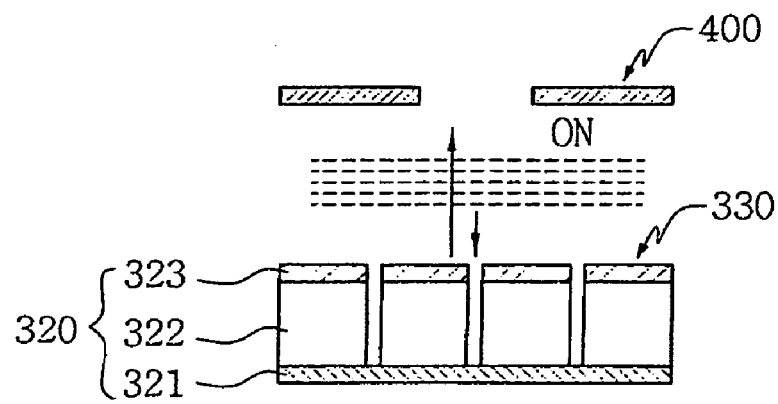
FIGS. 15 and 16 are views showing the operation of actuating cells constituting a piezoelectric/electrostrictive diffractive light modulator operating in response to drive power, according to the present invention.
Figure 15B:
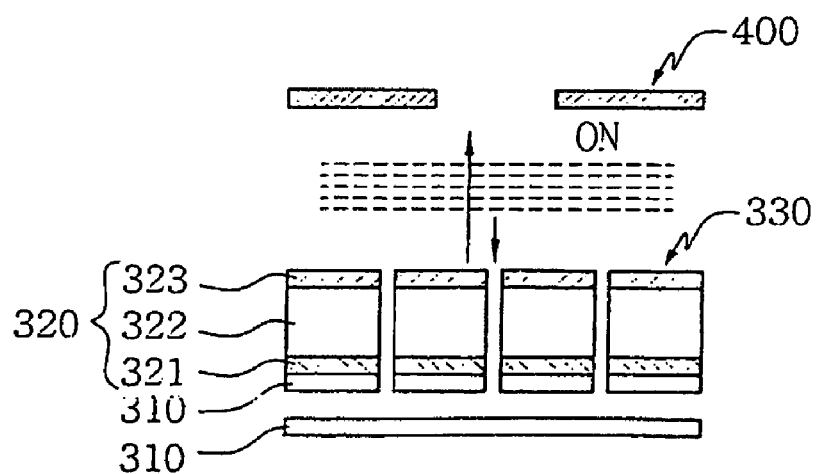

In this case, FIG. 15A is a view showing the formation of a 0th order diffracted beam by actuating cells 320, each having a thick film shape, constituting each pixel 330 of the piezoelectric/electrostrictive diffractive light modulator 300, and FIG. 15B is a view showing the formation of a 0th order diffracted beam by actuating cells 320 each having a thin film shape.

Figure 16A:
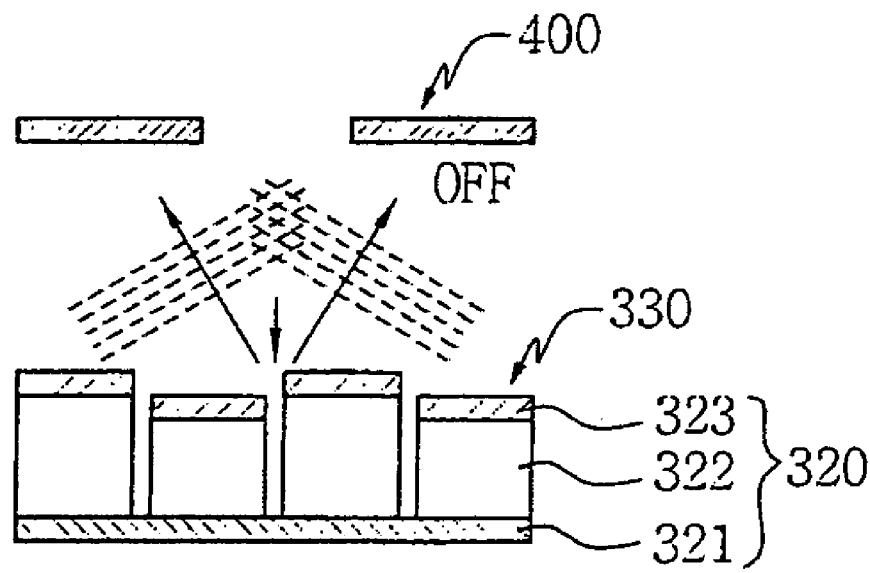
Figure 16B:
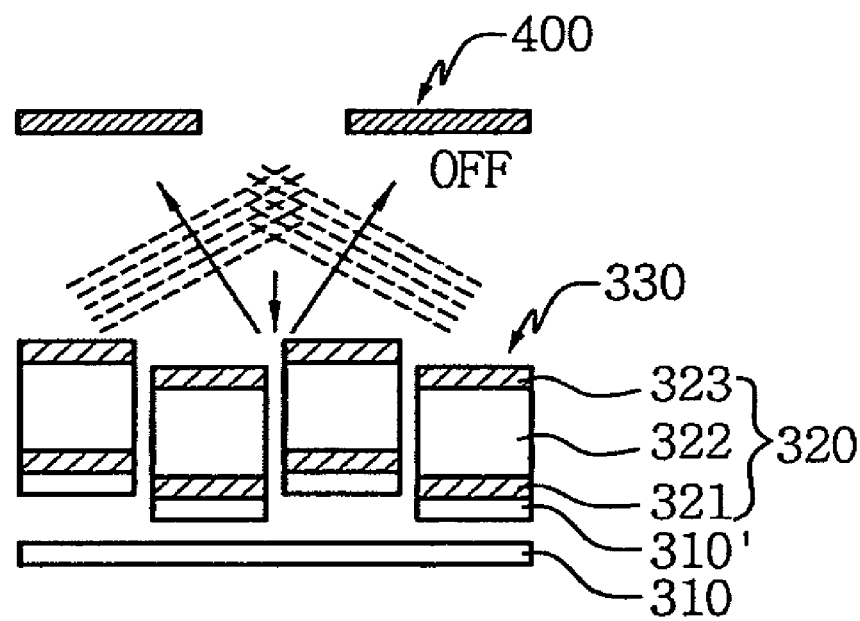

However, as shown in FIGS. 16A and 16B if drive power is externally applied, the pixels 330 constituting the piezoelectric/electrostrictive diffractive light modulator 300 form a variable diffraction grating depending on the driving variations of the actuating cells 320 that are vertically varied or not varied in response to the drive power, and diffract the single beam incident from the outside on the basis of the variable diffraction grating, thus forming a plurality of beams having certain diffraction coefficients.

In this case, FIG. 16A is a view showing the formation of ±1st order diffracted beams by thick-film shaped actuating cells 320 constituting each pixel 330 of the piezoelectric/electrostrictive diffractive light modulator 300, and FIG. 16B is a view showing the formation of ±1st order diffracted beams by thin-film shaped actuating cells 320.

At this time, if drive power is applied so that neighboring actuating cells 320 constituting each pixel 330 form a step height of ¼ of the wavelength of incident light, the pixels 330 minimize 0th order diffraction, and maximize +1st or −1st order diffraction.

That is, in a diffraction mode in which a step height between neighboring actuating cells 320, in detail, a height difference between reflective surfaces, is ¼ of the wavelength of incident light, ±1st order and higher order diffracted beams are formed, but they are intercepted by the slit 400, which will be described later, and cannot be transmitted to the second lens unit 500, so that the piezoelectric/electrostrictive diffractive light modulator 300 is in an OFF state.

At this time, if drive power is applied so that neighboring actuating cells 320 constituting each pixel 330 form a step height of 0 to ¼ of the wavelength of incident light, the pixels 330 simultaneously form diffracted beams having 0th, +1st and −1st order diffraction coefficients.

The actuating cells 320 constituting each pixel 330 of the piezoelectric/electrostrictive diffractive light modulator 300 control the level of their step heights depending on the strength of the externally applied drive power, thus controlling printing strength.

That is, if the applied drive power is a high voltage, the piezoelectric/electrostrictive material layer 322 forming the actuating cell 320 is greatly expanded upward or downward due to a piezoelectric phenomenon, thus increasing the printing strength of characters printed on a printing paper.

However, if the applied drive power is a low voltage, the piezoelectric/electrostrictive material layer 322 forming the actuating cell 320 is only slightly expanded upward or downward due to a piezoelectric phenomenon, thus decreasing the printing strength of characters printed on a printing paper.

Further, the piezoelectric/electrostrictive material layer 322 constituting each thin film-shaped actuating cell 320 moves vertically due to a piezoelectric phenomenon, thus controlling the printing strength of characters printed on a printing paper.

Therefore, the piezoelectric/electrostrictive diffractive light modulator 300 controls the height of the actuating cells 320 constituting each pixel 330 by finely adjusting the drive voltage applied to the actuating cells 320, thus performing true grayscale control in adjusting the intensity of diffracted beams having certain diffraction coefficients, especially, 0th order and ±1st order diffraction coefficients, in an analog manner.

In this case, the diffractive light modulator described with reference to FIGS. 15 and 16 shows a case where a 0th order diffracted beam is used as a signal, but ±1st order diffracted beams can be used as the signal using a suitable lens and slit if necessary.

The slit 400 receives diffracted beams formed after being diffracted by the piezoelectric/electrostrictive diffractive light modulator 300, and selectively allows only diffracted beams having certain diffraction coefficients, among the received diffracted beams, to pass therethrough. In detail, the slit 400 selectively allows only diffracted beams having certain diffraction coefficients, among diffracted beams having 0th, +1st and −1st order diffraction coefficients, to pass therethrough, thus allowing the passed diffracted beams to radiate to the second lens unit 500, which will be described later.

The second lens unit 500 focuses the diffracted beams having certain diffraction coefficients, incident through the slit 400, onto the photosensitive surface of the photosensitive member 600, such as a photosensitive drum, to form spots on the photosensitive surface. In detail, the second lens unit 500 may be a projection lens, as an example.

In the present invention, the second lens unit 500 focuses the diffracted beams to allow spots to be spaced apart from each other by a certain distance (for example, a distance within which a plurality of pixels can be placed; distance a, b and c of FIG. 3) without densely focusing the diffracted beams, at the time of focusing diffracted beams onto the photosensitive surface of the photosensitive member 600.

If the vibration means 800 vibrates the piezoelectric/electrostrictive diffractive light modulator 300, as shown in FIG. 4A, spots are gradually moved by one pixel, as shown in (A) to (D) of FIG. 4B.

Therefore, if, for example, 5000 pixels are required, the pixels can be implemented using only 500 actuating cells with the aid of the vibration means 800.

In this case, the vibration means 800 can obtain vibration using a piezoelectric material, or an electrostatic or magnetostatic force.

Hereinafter, with reference to FIGS. 3 and 4A and 4B, the operation of the scanning apparatus using a piezoelectric/electrostrictive diffractive vibration light modulator according to the present invention is described in detail.

First, a single spherical beam generated by the light source 100, more specifically, a single LD, is incident on the first lens unit 200 including the collimator lens 210 and the cylindrical lens 220 formed on an optical axis.

In this case, the single spherical beam incident on the collimator lens 210 constituting the first lens unit 200 is converted into collimated light, and is then incident on the cylindrical lens 220.

At this time, the cylindrical lens 220 converts the collimated light incident from the collimator lens 210 into parallel linear light, and focuses the linear light onto the diffractive light modulator so as to allow the collimated light to be incident, in parallel, on the piezoelectric/electrostrictive diffractive light modulator 300 placed parallel to an optical path.

As described above, if the single beam, converted into parallel linear light by the first lens unit 200, is focused, the piezoelectric/electrostrictive diffractive light modulator 300 uses the pixels 330, each including a certain number of actuating cells 320, as a reflector, or as a variable diffraction grating which forms diffracted beams having 0th, +1st and −1st order diffraction coefficients depending on the step height formed between the actuating cells 320, according to the existence of externally applied drive power.

That is, when drive power is not externally applied, the actuating cells 320 constituting each pixel 330 of the piezoelectric/electrostrictive diffractive light modulator 300 do not form step height therebetween, so that each pixel 330 emits a diffracted beam having a 0th order diffraction coefficient, which is formed by performing 0th order diffraction on the incident single beam, to the photosensitive member 600.

Further, when external drive power is applied, the actuating cells 320 constituting each pixel 330 of the piezoelectric/electrostrictive diffractive light modulator 300 form step height therebetween, so that each pixel 330 emits a diffracted beam having a +1st or −1st order diffraction coefficient, which is formed by performing diffraction on the incident single beam, to the photosensitive member 600.

In this case, as shown in FIGS. 13A and 13B and 14A and 14B, the piezoelectric/electrostrictive diffractive light modulator 300 forms a one-dimensional diffracted beam or two-dimensional diffracted beam having a certain diffraction coefficient depending on the array shape of the pixels 330 arranged in one dimension or two dimensions.

Further, the piezoelectric/electrostrictive diffractive light modulator 300 finely adjusts the level of step height formed between the actuating cells 320 constituting each pixel 330 depending on the strength of the externally applied drive power, thus performing true grayscale control in adjusting the intensity of diffracted beams having certain diffraction coefficients, especially, 0th order and ±1st order diffraction coefficients, in an analog manner.

That is, if the applied drive power is a high voltage, the piezoelectric/electrostrictive material layer 322 forming the actuating cell 320 is greatly expanded upward or downward due to a piezoelectric phenomenon, thus increasing the printing strength of characters printed on a printing paper.

However, if the applied drive power is a low voltage, the piezoelectric/electrostrictive material layer 322 forming the actuating cell 320 is only slightly expanded upward or downward due to the piezoelectric phenomenon, thus decreasing the printing strength of characters printed on a printing paper.

As described above, if diffracted beams having certain diffraction coefficients formed by the piezoelectric/electrostrictive diffractive light modulator 300 are incident on the slit 400, the slit 400 allows only diffracted beams having preset diffraction coefficients to pass therethrough and filters out diffracted beams having other diffraction coefficients.

That is, the slit does not filter out a diffracted beam having a 0th order diffraction coefficient, but filters out diffracted beams having +1st and −1st order diffraction coefficients.

Therefore, the slit 400 allows the diffracted beam having a 0th order diffraction coefficient to pass therethrough without filtering, so that the scanning apparatus of the present invention is in an ON state in which spots are formed on the photosensitive surface of the predetermined photosensitive member.

However, the slit 400 prohibits diffracted beams having +1st or −1st order diffraction coefficients from passing therethrough by filtering out the diffracted beams, so that the scanning apparatus of the present invention is in an OFF state in which spots are not formed on the photosensitive surface of the photosensitive member.

As described above, if diffracted beams having certain diffraction coefficients, which are selectively passed by the slit 400, are incident on the projection lens 500, the projection lens 500 performs scanning to focus the incident diffracted beams having certain diffraction coefficients in one dimension or two dimensions onto the photosensitive surface of the photosensitive member 600, thus simultaneously scanning beams onto the photosensitive surface along one or more lines.

At this time, in the present invention, the second lens unit 500 focuses the diffracted beams to allow spots to be spaced apart from each other by a certain distance (for example, a distance within which a plurality of pixels can be placed; distance a, b and c of FIG. 3) without densely focusing the diffracted beams, at the time of focusing diffracted beams onto the photosensitive surface of the photosensitive member 600. That is, as shown in the drawings, spots are preferably formed to be spaced apart from each other by a distance within which three pixels can be arranged when the spots are formed on the projection lens 500.

Further, if the vibration means 800 sequentially vibrates the piezoelectric/electrostrictive diffractive light modulator 300 downward, as shown in FIG. 4a, the positions of the spots gradually move to the right.

That is, as shown in (A) of FIG. 4B, spots are formed on initial locations by a distance within which three pixels can be arranged. Thereafter, if the piezoelectric/electrostrictive diffractive light modulator 300 is vibrated by the vibration means 800, the spots move to the right by one pixel, as shown in (B) of FIG. 4B.

If the vibration means 800 continues to vibrate the piezoelectric/electrostrictive diffractive light modulator 300, the spots move to the right by one pixel, as shown in (C) of FIG. 4B, and, consequently, move to the right to the location of the last pixel, as shown in (D) of FIG. 4B, so that all pixels are formed.

Therefore, if, for example, 4000 pixels are required, the pixels can be implemented using only 1000 actuating cells with the aid of the vibration means 800.

As described above, the present invention provides a scanning apparatus using a diffractive light modulator, which is advantageous in that it can form a plurality of pixels using a small number of actuating cells, so that the scanning apparatus can be easily manufactured.

Further, the present invention is advantageous in that the scanning apparatus is implemented using a small number of actuating cells, so that it can be easily controlled.

Further, the present invention is advantageous in that it uses a small number of actuating cells, thus reducing the required cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning apparatus using a vibration light modulator, comprising:
    a first lens unit for scanning a single beam, emitted from a light source, parallel to an optical path direction;
    a light modulator comprising a plurality of actuating cells formed on a substrate, the plurality of actuating cells being selectively movable relative to the substrate to generate a plurality of diffracted beams from the single beam;
    vibration means for vibrating the light modulator substrate;
    a slit for allowing diffracted beams having certain diffraction coefficients, among the plurality of diffracted beams incident from the light modulator, to pass therethrough;
    a second lens unit for radiating the diffracted beams having certain diffraction coefficients, selectively passed through the slit, onto a photosensitive surface of a photosensitive member while spacing the diffracted beams apart from each other by a predetermined distance,
    wherein said vibration means is configured to rotate the light modulator substrate back and forth about an axis to vary the angle of the light modulator substrate relative to the photosensitive member, thereby redirecting a diffracted beam generated by the light modulator and passed through the slit onto a plurality of locations on the photosensitive surface of the photosensitive member, the plurality of locations having predetermined distances therebetween.

2. The scanning apparatus according to claim 1, wherein the light modulator is a reflective light modulator.

3. The scanning apparatus according to claim 1, wherein the light modulator is a transmissive light modulator.

4. The scanning apparatus according to claim 1, wherein the light modulator is a diffractive light modulator.

5. The scanning apparatus according to claim 4, wherein the diffractive light modulator is a thick-film shaped diffractive light modulator.

6. The scanning apparatus according to claim 4, wherein the diffractive light modulator is a thin-film shaped diffractive light modulator.

7. The scanning apparatus according to claim 1, wherein the light modulator is a piezoelectric/electrostrictive diffractive light modulator.

8. The scanning apparatus according to claim 7, wherein the diffractive light modulator is a thick-film shaped diffractive light modulator.

9. The scanning apparatus according to claim 8, wherein the piezoelectric/electrostrictive diffractive light modulator comprising actuating cells, each comprised of a lower electrode formed on a substrate, a piezoelectric/electrostrictive layer formed on the lower electrode, and an upper electrode formed on the piezoelectric/electrostrictive layer, each vertically driven by externally applied drive power, and each formed in a thick film shape with a vertical length longer than a horizontal length.

10. The scanning apparatus according to claim 7, wherein the diffractive light modulator is a thin-film shaped diffractive light modulator.

11. The scanning apparatus according to claim 10, wherein the piezoelectric/electrostrictive diffractive light modulator comprising actuating cells each comprised of a lower electrode, a piezoelectric/electrostrictive layer and an upper electrode that are sequentially formed on a substrate, on which a depression for providing an air space is formed in a center portion, each horizontally driven by externally applied drive power, and each formed in a thin film shape with a vertical length longer than a horizontal length.

* * * * *